UNITED STATES PATENT OFFICE.

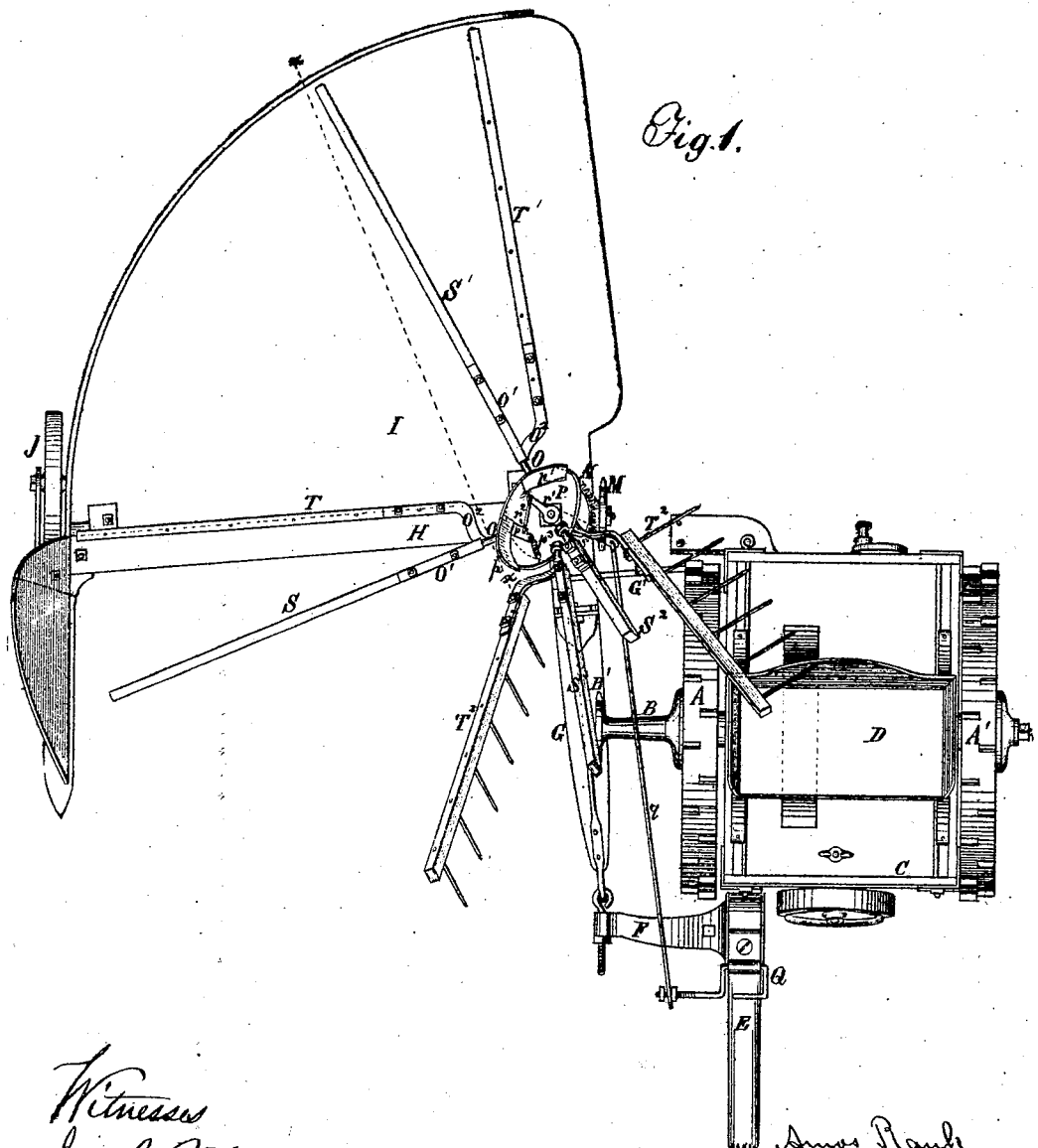

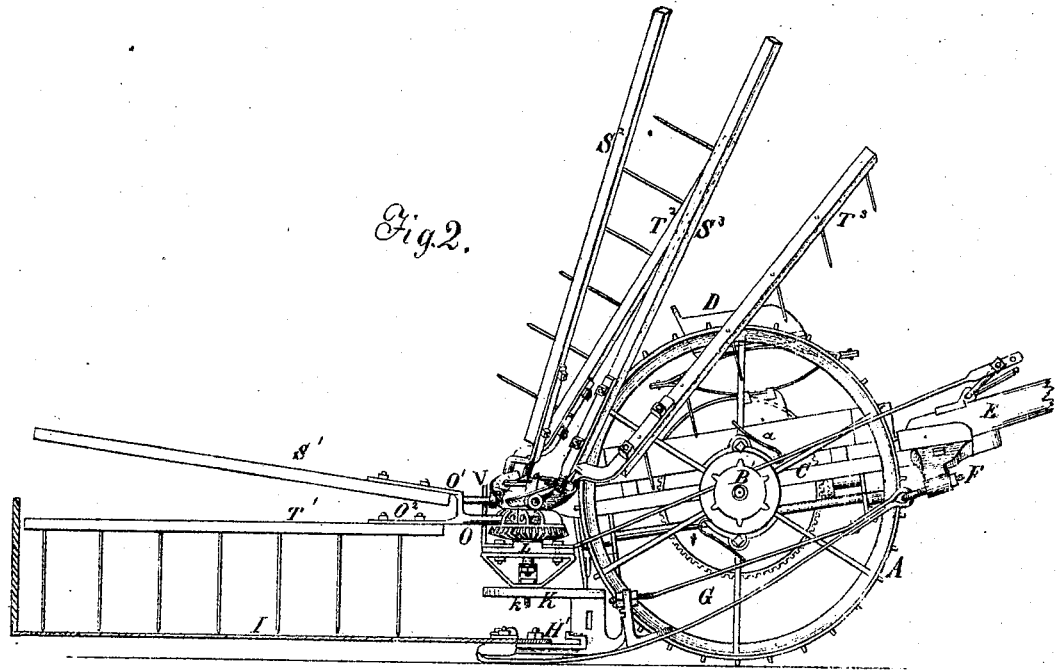
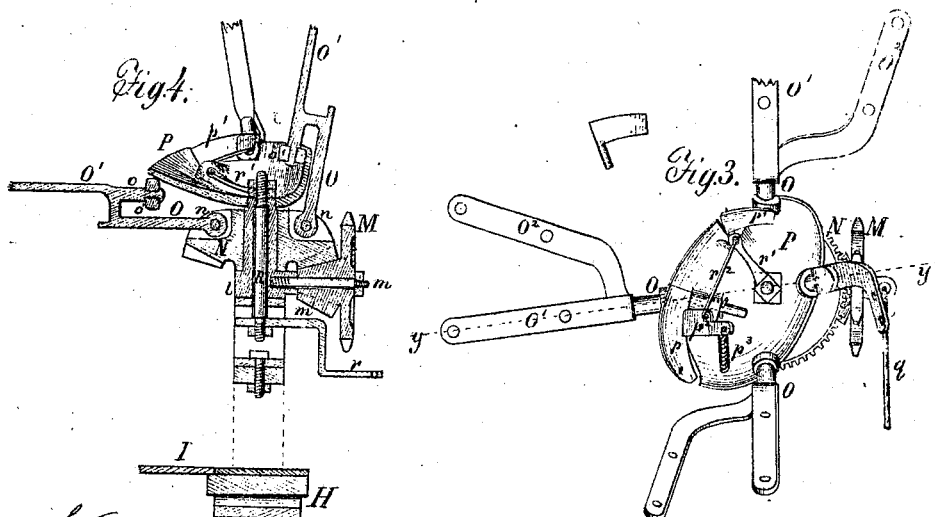

AMOS RANK, OF SALEM, OHIO.

IMPROVEMENT IN HARVESTER-RAKES.

Specification forming part of Letters Patent No. 96,353, dated November 2, 1869.

*To all whom it may concern:*

Be it known that I, AMOS RANK, of Salem, in the county of Columbiana and State of Ohio, have invented certain new and useful Improvements in Harvester-Rakes, of which the following is a full, clear, and exact description.

My invention relates to that class of harvester-rakes in which a series of combined rake and reel arms is independently pivoted to and revolves around an axis vertical, or nearly so, the rakes being so constructed that any one of them can, at the will of the driver, be caused to sweep the gavel from the platform, the rakes not so employed acting as beaters merely to press back the grain upon the platform; and the distinguishing characteristic of my invention is the arrangement inside of the camway which controls the movements of the rake and reel-arms of the mechanism for throwing the rakes into action.

In the accompanying drawings the improvements herein claimed are shown as adapted to the well-known "Ætna" harvester, on which sundry Letters Patent of the United States have been obtained by me. It, however, is obvious that these improvements readily might be adapted to harvesters of a construction different to that herein shown, such, for instance, as front-cut machines, or to machines having rigid finger-beams.

Figure 1 represents a plan or top view of my improved machine; Fig. 2, a side elevation of the same, partly in section at the line $x\,x$ of Fig. 1; Fig. 3, a plan view, on an enlarged scale, of the rake controlling mechanism; Fig. 4, a vertical section through the same at the line $y\,y$ of Fig. 3.

The driving-wheels A A' revolve loosely on the main axle B, with which they are connected by suitable backing-ratchets $a$. The main frame C is arranged between the wheels, and carries a driver's seat, D. A tongue, E, projects from the inner front corner of the main frame.

An arm, F, projecting from the main frame, or from the tongue, supports the forward end of a drag-bar, G, to which the finger-beam H is secured. A hinged coupling-arm, G', supports the drag-arm G laterally.

The platform I is connected with the finger-beam, and supported by the usual grain-wheel J in any well-known way.

When reaping, the heel end of the finger-beam is supported by a cord or chain from the main frame, as usual in machines of this class.

An overhanging bracket, K, extends backward over the inner shoe H'. A frame, L, is secured to this bracket by a set-screw, $k$, which is adjustable backward or forward in a longitudinal slot in the bracket, so as to permit the rake to be set backward or forward, as desired.

A vertical collar or tubular stud, $l$, secured on this frame, supports a horizontal short shaft, $m$, carrying a sprocket-pulley, M, and a bevel-pinion, $m'$. The latter gears into a bevel-wheel, N, revolving on the collar $l$.

Rake arms O are pivoted to lugs $n$ on this wheel, so as to vibrate freely in a vertical plane. An ovoid bowl-cam, P, is firmly secured on top of the stud $l$, and is provided with two switches, $p\,p^1$, on its grain side.

A rock-shaft, R, passes vertically through the stud $l$, and is turned by a crank, $r$, operated from the main frame by a link-rod, $q$, and foot-lever Q. A similar crank-arm, $r^1$, on the upper end of the rock-shaft is connected by a link, $r^2$, with a lug, $p^2$, on the front switch $p$, to open or close this switch as desired.

The rake-arm O is bifurcated, one of its branches, $O^1$, being bent up vertically a short distance, and again bent out horizontally. A stud, $o$, projecting behind the vertical portion of the branch, carries a friction-roller, $o'$, which runs on either side of the cam P, as hereinafter explained. A beater, S, is secured to the outer horizontal part of this branch.

The outer branch $O^2$ of the arm O is curved backward horizontally a short distance, and then curved forward again at a less angle, as shown in Fig. 3, and this arm carries a rake, T.

In the drawings four rakes, T $T^1$ $T^2$ $T^3$, are shown, and also a corresponding number of beaters, S $S^1$ $S^2$ $S^3$, but this number might be increased, if preferred.

The machine is to be provided with a proper cutting apparatus, gearing, and all other requisites of a fully-organized harvester. A sprocket-wheel, B', on the end of the main axle, drives the pulley M by means of a chain, and thus rotates the rakes by means of the gears $m'$ N. The friction-rollers $o'$ ordinarily run on the upper side of the guide-cam $p$, and thus hold the rakes high enough above the platform merely to reel back the grain without sweeping it from the platform. The cam is made in the shape shown in the drawings, to hold the rakes nearly vertical when passing around the grain side of their axis of rotation.

When a gavel of sufficient size has accumulated on the platform, the driver with his foot operates the treadle Q, so as to draw forward the crank $r$ and turn the rock-shaft R. This movement retracts the crank $r^1$, and opens the switch $p$. The first roller $o'$ which comes along passes through this switch to the under side of the guide-cam P, which movement holds the rake down and causes it to sweep the gavel from the platform. If the switch were held open, all the rakes in succession would thus be held down; but if it is closed as soon as the rake has passed through, the other rollers will run over it, and the remaining rakes remain elevated. The switch, when released by the driver, is closed by the spring $p^3$. The arm O of the rake, which sweeps off the gavel after the discharge is completed, strikes an incline, $v$, Fig. 2, which causes the rake to rise through the back switch $p^1$ to the upper side of the cam. This operation is repeated as often as a gavel is discharged.

My method of operating the switch through the center of the rake-shaft is a very convenient and advantageous one, as it secures a compact arrangement of the mechanism at a point where it is protected from accidents.

The arms S $S^1$ $S^2$ $S^3$ are advantageous, as they enable me to reach into the standing grain at shorter intervals than the rakes alone would do. I am aware that a double rake-head has been used, but both rakes in such cases are in the same horizontal plane. It is obvious that the rakes alone would work effectively without the beater-arms. The beater-arms might also be used on the side of the rake opposite to that shown in the drawing.

What I claim as my invention, and desire to secure by Letters Patent, is—

1. The combination of the guide-cam and its switch $p$ with the rock-shaft for opening the switch, passing through the axis of rotation of the rakes, substantially as hereinbefore set forth.

2. The arrangement, as set forth, of the guide-cam, the switch $p$, the lug $p^2$, and the closing-spring $p^3$.

3. The arm O, bifurcated for the attachment of alternate rakes and beaters, substantially as set forth.

4. The combination of the guide-cam, the switch $p$, the bifurcated arm O, the friction-roller $o'$, and its arm $o$, all these parts being constructed to operate as set forth.

In testimony whereof I have hereunto subscribed my name.

AMOS RANK.

Witnesses:
THOS. G. BAIRD,
JOHN W. SATTERTHWAIT.